T. MIDGLEY.
RIM FOR VEHICLE WHEELS.
APPLICATION FILED APR. 1, 1913.

1,098,163.

Patented May 26, 1914.

Witnesses
Edw. W. Vaill.
J. B. Vanderbilt

Inventor
Thomas Midgley.
By his Attorney
Ernest Hopkinson

UNITED STATES PATENT OFFICE.

THOMAS MIDGLEY, OF WORTHINGTON, OHIO.

RIM FOR VEHICLE-WHEELS.

1,098,163.  Specification of Letters Patent.  Patented May 26, 1914.

Application filed April 1, 1913. Serial No. 758,107.

*To all whom it may concern:*

Be it known that I, THOMAS MIDGLEY, a citizen of the United States, residing at Worthington, county of Franklin, and State of Ohio, have invented certain new and useful Improvements in Rims for Vehicle-Wheels, of which the following is a full, clear, and exact disclosure.

My invention relates to rims for vehicle wheels, and particularly to those which employ pneumatic or inflatable tires having either inelastic or hooked edges.

The object of my invention is to provide a rim which may be used with either of these types of tires, and which may be easily converted to accommodate either type by simply reversing the tire-retaining rings, and one which will at the same time cause said rings to be held firmly in position by the expansible action of the tire when inflated.

Figure 1:
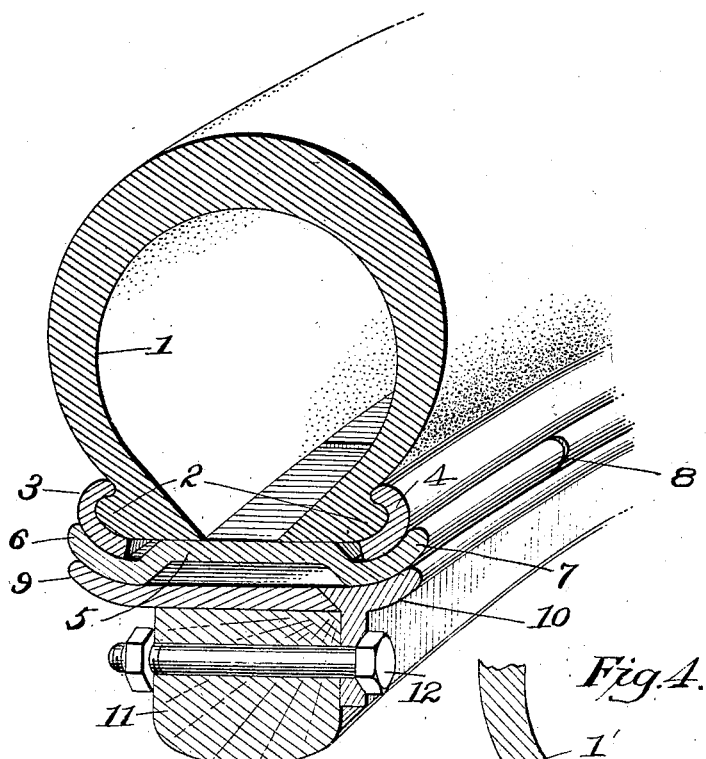
Figure 3:
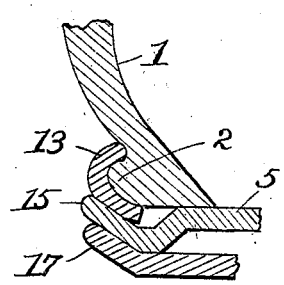
Figure 4:
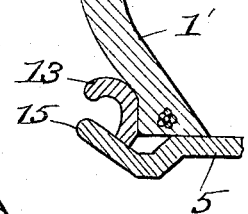
Figure 2:
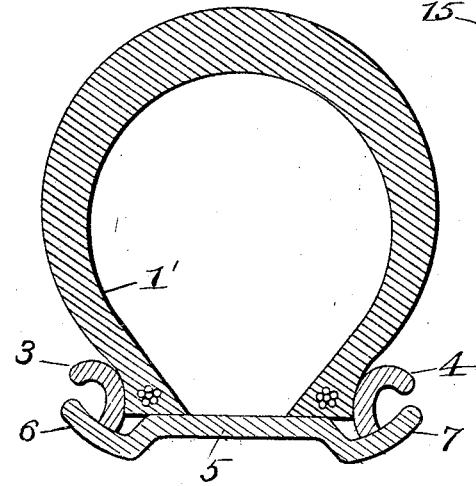

For a detailed description of this form of my invention, reference may be had to the following specification and to the accompanying drawings, forming a part thereof, in which:

Figure 1 is a transverse sectional view of the rim showing the parts in perspective, with a clencher tire or tire having hooked edges, in position. Fig. 2 is a transverse sectional view of my improved rim, showing a tire with inexpansible edges, or that known as the Dunlop type of tire, in position thereon. Fig. 3 is a sectional view, showing a modification of my improved rim. Fig. 4 is a similar view, showing the corresponding tire ring reversed.

Referring to the drawings, the numeral 1 indicates a tire casing of the clencher type, having marginal beads 2 for retaining the tire in position upon the rim.

3 and 4 indicate endless tire rings which are made of the peculiar shape indicated, to efficiently engage the hooked edges of the casing 1, and at the same time are capable of reversal.

The numeral 5 indicates a base ring having curved marginal edges 6 and 7 which start from a point within the outer surface of the base ring 5, thereby forming grooves within which the tire rings 3 and 4 may be seated. The base ring 5 is a split ring, as indicated at 8, and is therefore expansible and contractible.

The felly band is composed of two parts 9 and 10, the part 9 being permanently fastened to the felly 11, and the part 10 being removable, all held in position by bolts 12 which pass through the felly. The edges of the felly band are turned upward slightly, so as to form a central groove, as indicated in Fig. 1. It will now be seen that when it is desired to place a tire in position on the wheel, the tire rings 3 and 4 are first caused to engage the beads 2 upon the tire casing 1, the split base ring is then snapped into position to retain the tire rings in contact with the tire, the base ring with the tire thereon is placed around the part 9 of the felly band, and the part 10 is then fastened in position by means of the bolt 12. By reason of the expansion of the tire when inflated, the tire rings 3 and 4 will tend to move away from each other transversely of the tire, thereby contracting the base ring 8 so that it is firmly seated within the sections 9 and 10 of the felly band. Any further separation of the tire rings will simply cause the same to move upwardly on the flanges 6 and 7 of the base ring 5 until they are firmly wedged into position. Substantially the same method of assembly is employed when a Dunlop tire is used, as indicated in Fig. 2, the only difference being that the tire rings 3 and 4 are reversed so that their convex surfaces come close to the margin of the tire. The inner edges of these tire rings are substantially at right angles to their outer and inner surfaces, so that they will move upon the flanges 6 and 7 in the same manner that the convex surfaces of the said rings do when used with a clencher tire, as indicated in Fig. 1.

The modification shown in Figs. 3 and 4 operates in the same manner as described in connection with Figs. 1 and 2, the contact surfaces, however, between the tire rings 13 and the flanges 15 of the base ring being made straight, instead of curved, and similarly, the contact surfaces between the flanges 15 and the margins 17 of the felly band are also made straight. The tire rings when reversed, operate to slide on the margins of the base ring, as heretofore described, and as illustrated in Fig. 4.

Having thus described this form of my invention, what I desire to claim and protect by Letters Patent is:

1. A rim for vehicle wheels, comprising an expansible base ring, upwardly extending flanges of the sides thereof, tire rings having correspondingly inclined outer surfaces and concave inner surfaces, the inner edges of said tire rings being at substantially right angles to the outer inclined surfaces thereof, so as to contact with said flanges when the same are reversed.

2. A rim for vehicle wheels, comprising an expansible base ring, upwardly curved flanges at the sides thereof, tire rings having correspondingly curved outer surfaces and concave inner surfaces, the inner edges of said tire rings being at substantially right angles to the concave and convex surfaces thereof, so as to contact with said flanges when the same are reversed.

3. A rim for vehicle wheels, comprising an expansible base ring having upwardly extending flanges at the margins thereof, said flanges starting from a point below the outer surface of said base ring, thereby forming marginal grooves, curved tire-retaining flanges having outer inclined surfaces and inner concave surfaces and inner edges at right angles to said surfaces so that the same may be seated within said upwardly extending flanges, either with their inclined surfaces in contact therewith, or with their inner edges in contact therewith.

Signed at Detroit, county of Wayne, State of Michigan, this 26th day of March, 1913.

THOMAS MIDGLEY.

Witnesses:
JOHN CARLSON,
J. H. SWIFT.